United States Patent [19]
Miller et al.

[11] 3,804,115
[45] Apr. 16, 1974

[54] AIR SUPPLY MANIFOLD FOR A HYDROTHERAPY TREATMENT SYSTEM

[75] Inventors: Robert C. Miller, Elgin; Carl K. Miller, Libertyville, both of Ill.

[73] Assignee: Borg-Warner Corporation, Chicago, Ill.

[22] Filed: Dec. 28, 1971

[21] Appl. No.: 213,145

[52] U.S. Cl.................... 137/525, 128/66, 285/244
[51] Int. Cl............................................ F16k 15/14
[58] Field of Search ............ 137/525; 285/242, 244, 285/254, 255, 344; 4/180; 128/66

[56] References Cited
UNITED STATES PATENTS
1,067,202   7/1913   Stacey............................... 285/254
437,289   9/1890   Clark............................ 285/344 X FOREIGN PATENTS OR APPLICATIONS
410,024   3/1910   France............................... 285/254

*Primary Examiner*—Robert G. Nilson
*Attorney, Agent, or Firm*—William S. McCurry

[57] ABSTRACT

An air supply manifold is described having an outlet nozzle that may be attached to an apertured conduit or air tube, integrally formed in a flexible plastic film, in order that pressurized air may be channeled through the apertures in the conduit and then injected into the water of a hydrotherapy tank to effect agitation. The flexible conduit is inserted or slipped over the nozzle and is held attached by means of a snugly fitting elastic O-ring placed around the conduit and received in an annular groove formed in the nozzle. The radially inward pressure of the O-ring is sufficient to establish a connection between the conduit and nozzle which is air-tight at normal operating pressures. The conduit will, however, blow off of the nozzle at a predetermined blow-off pressure. In this way, the connection also serves as a pressure relief valve to protect the conduit against damage from excessive pressure.

1 Claim, 4 Drawing Figures

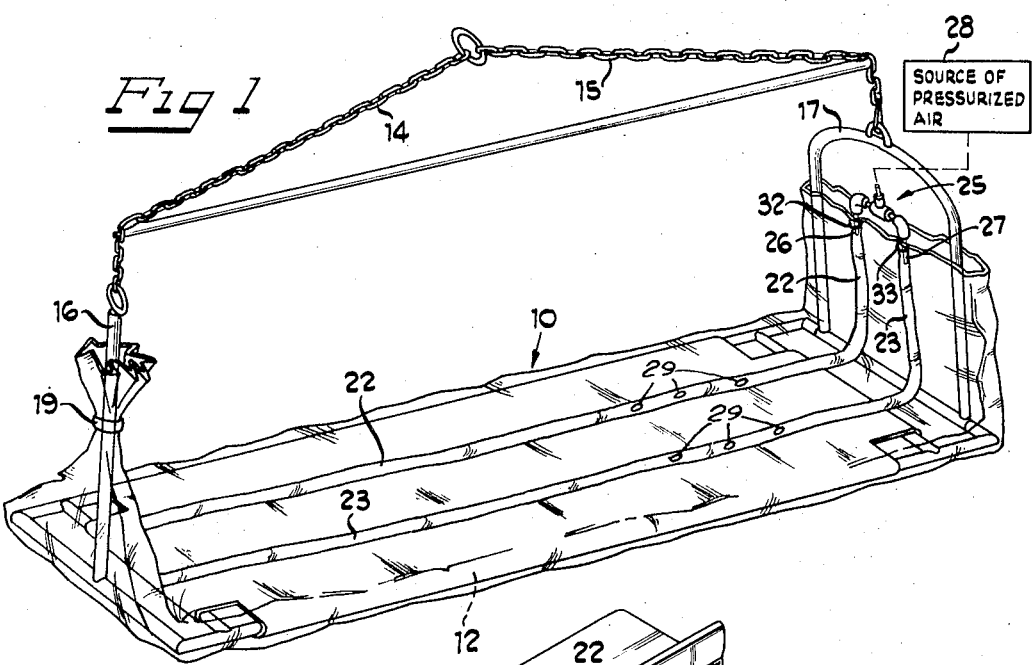
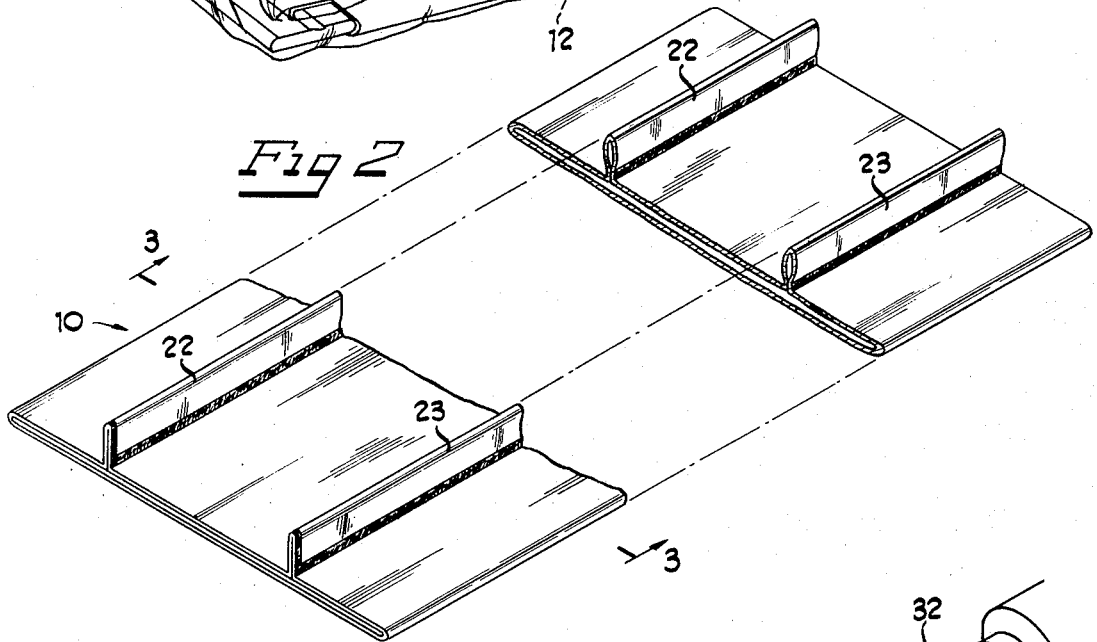
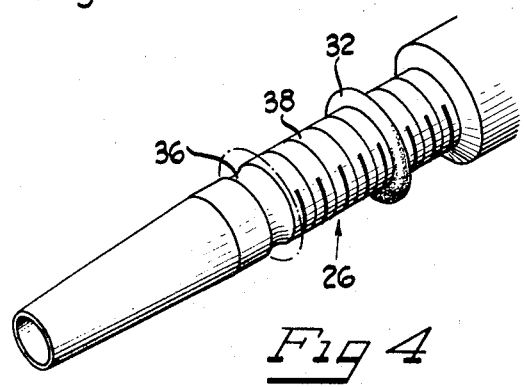

AIR SUPPLY MANIFOLD FOR A HYDROTHERAPY TREATMENT SYSTEM

BACKGROUND OF THE INVENTION

Hydrotherapy treatment systems have been developed wherein the required water agitation is accomplished by injecting pressurized air through openings in an air tube or conduit placed in the water. Such air tubes may take a variety of different constructions. As shown in U.S. Pat. No. 3,617,418 issued Nov. 2, 1971 in the name of Robert C. Miller, the conduits are formed of flexible plastic film. Moreover, they are integrally formed, by heat sealing, in a large plastic sheet which lines the hydrotherapy tank to prevent the transfer of bacteria between the water and the interior surfaces of the tank. On the other hand, in copending application Ser. No. 213,142 filed concurrently herewith in the name of Robert C. Miller, and issued May 1, 1973 as U.S. Pat. No. 3,730,176, there is described and claimed the concept of integrally forming apertured air tubes in a flexible plastic sleeve or sheath that covers a patient-carrying litter or plinth to provide a barrier to block bacteria transmission.

Conduits formed in plastic film, regardless of whether the film lines a hydrotherapy tank or encases a litter, must be attached to a source of pressurized air and preferably it should be possible to make these attachments in a quick, easy and reliable manner. Unfortunately, previously developed coupling devices cannot satisfy these requirements. The problem has, however, been overcome by the present invention which provides a uniquely constructed air supply manifold having an inlet coupled to a pressurized air source and at least one outlet easily connectible to a flexible plastic conduit even though the conduit is integrally formed in a much larger sheet.

SUMMARY OF THE INVENTION

The air supply manifold of the invention couples a source of pressurized air to an apertured conduit, integrally formed in a flexible plastic film, to inject pressurized air into the water of a hydrotherapy tank. The manifold comprises an outlet nozzle having a tapered end section followed by an annular groove. The maximum diameter of the nozzle is less than that of the conduit to permit the conduit to be slipped over the nozzle to a point beyond the groove. A snuggly-fitting elastic O-ring is placed over the conduit and in the groove. It exerts a radially inward pressure on the conduit sufficient to establish a connection between the conduit and nozzle that is air-tight at normal operating pressures. The radially inward pressure is appropriately set so that the flexible plastic conduit blows off of the nozzle at a predetermined blow-off pressure. This effectively provides a pressure relief valve to protect the conduit against damage otherwise caused by excessive pressure.

DESCRIPTION OF THE DRAWING

The features of the invention which are believed to be novel are set forth with particularity in the appended claims. The invention, together with further advantages thereof, may best be understood, however, by reference to the following description in conjunction with the accompanying drawing in which like reference numbers identify like elements, and in which:

FIG. 1 is a perspective view of a sufficient portion of a hydrotherapy treatment system to illustrate the manner in which the air supply manifold of the invention may be incorporated in that system;

FIG. 2 is a perspective view of one of the elements shown in FIG. 1;

FIG. 3 is a sectional view of the element taken along section line 3—3 in FIG. 2; and FIG. 4 is an enlarged perspective view of a portion of the air supply manifold shown in FIG. 1.

DESCRIPTION OF THE ILLUSTRATED EMBODIMENT

The illustrated system has a contamination prevention device designated by the reference number 10 which constitutes a flexible water-tight sleeve or sheath open at both ends. It is preferably made of transparent plastic film such as polyethylene. A patient-carrying litter or plinth 12 has its head and foot ends upwardly connected to and held by a hoist mechanism, not shown. Specifically, upward extension or connection member 16 connects the foot end to hoise chain 14, while extension 17 joins the head end to chain 15. The hoist chains may be disconnected from their associated connecting members 16, 17 so that sleeve 10 may be slipped over, thereby to cover or encase, the entire litter 12 and all or most of both hoist connections 16, 17. Preferably, members 16 and 17 are pivotally coupled to the ends of the litter to allow all three components 12, 16 and 17 to be extended in the same plane to ease the task of inserting the sleeve over those components. For maximum ease in handling, members 16 and 17 should be detachable.

With sleeve 10 positioned as shown in FIG. 1, litter 12 and hoist connections 16, 17 will be completely isolated from any contact with the water in a hydrotherapy tank when the plinth, bearing a patient, is lowered into that water to the extent necessary to submerge the patient's body with the exception of his or her head which will be supported on a head rest. The two open ends of sleeve 10 will, of course, be well above the surface of the water. Hence, there is no way for bacteria to travel from the isolated elements to the water or visa versa.

At the foot end the sleeve may be gathered together and tied to hoist connection 16 by any suitable means, such as by tape 19 as shown in FIG. 1.

At the conclusion of the hydrotherapy treatment, plinth 12 is raised and removed from the tank by the hoist mechanism, after which sleeve 10 is disposed of since it will now be contaminated with bacteria from the patient just treated. The water, of course, is also drained and the internal surfaces of the tank must be sterilized. One convenient method of blocking bacteria transfer to and from the tank surfaces, without sterilizing those surfaces, is to drape or line the entire inside of the tank with a large sheet of flexible plastic film, as described and claimed in copending application Ser. No. 12,216, filed Feb. 18, 1970 in the name of Robert C. Miller et al., and issued Mar. 14, 1972 as U.S. Pat. No. 3,648,690. A new sleeve and new water will be used for the next patient. Thus there will be no way for bacteria to be transferred from one patient to the next.

Agitation of the water may be accomplished with any appropriate equipment, such as a water pump. When a pump is used, however, it must be sterilized after each use. A preferred way to introduce the required water agitation is to inject pressurized air directly into the water. This is done by attaching conduits or air tubes to the sleeve on the external side closest to the patient. Alternatively, and as shown in the drawing, the conduits may be integrally formed in the sleeve.

Specifically, two air tubes 22 and 23 are built into sleeve 10 by appropriately folding and then heat sealing it along lines parallel to the folds. The left or foot ends of the conduits are closed as shown in FIG. 2, which closings may also be achieved by heat sealing, while the right or head ends are coupled to outlet nozzles 26, 27 of an air supply manifold 25, the inlet of which is coupled to a source 28 of pressurized air, which source may constitute a conventional air compressor. Before the patient is placed on the sleeve-covered litter, a therapist punctures the air tubes to provide openings therein where agitation is desired for the particular patient to be treated. In the illustrated embodiment, six openings or holes 29 have been made in air tubes 22 and 23 by the therapist. In this way, when the litter and patient are placed in the water-filled hydrotherapy tank and air is delivered from source 28 to the air tubes, pressurized air is injected through the punched holes 29 and into the water to effect agitation thereof to treat only those parts of the patient's body needing treatment. For many patients it is extremely important not to disturb especially sensitive or painful areas.

In accordance with the present invention, conduits 22 and 23 are rsspectively held onto nozzles 26 and 27 by means of snugly fitting elastic O-rings 32 and 33. More particularly, nozzles 26 and 27 are spaced apart a distance less than the spacing between the air tubes. The enlarged view of nozzle 26 in FIG. 4 will be helpful in understanding the specific manner in which conduits 22 and 23 are attached to the nozzles. Of course, nozzle 27 is identical to nozzle 26 so only one is shown in FIG. 4. The end of each nozzle is tapered, increasing to a maximum diameter less than that of the air tube to which it is to be coupled, so that the tube may be quickly and easily slipped over the nozzle. An annular groove (see groove 36 in FIG. 4) is formed in each nozzle, following the tapered end section, to accommodate the associated O-ring.

Before each air is slipped or inserted over the nozzle, the O-ring is first rolled away from the groove, namely to the right as viewed in FIG. 4. This step is aided by providing a threaded section beyond the groove, as indicated by reference number 38. With the O-ring out of the way, the air tube may be slipped over the nozzle to a point well beyond the groove, after which the O-ring may be rolled back over the tube and into the groove, as shown in dashed construction in FIG. 4. The O-ring exerts a radially inward pressure on the conduit sufficient to establish a mechanical support and an air-tight connection or air seal for normal operating pressures. The spacing of nozzles 26 and 27 is less than that of the air tubes to allow the flexible plastic film to be gathered under each O-ring and around the nozzles.

By suitable shaping and sizing of the O-ring grooves and by adjusting the size of the O-rings, the radially inward pressure at each groove may be set so that the air tubes will be blown off of their nozzles at a predetermined blow-off pressure. The connections at nozzles 26 and 27 thus effectively provide pressure relief valves to protect conduits 22 and 23 against damage otherwise caused by excessive pressure. In particular, splitting of the air tubes is prevented in the event air at a relatively high pressure is supplied to the tubes before holes have been puched therein. In one application of the invention, a pressure head of less than 1 PSI was needed at each air tube to provide adequate air flow and water agitation. Under those circumstances, the attachment of the tubes to the air supply manifold were made to blow off at a pressure around 3 PSI, which is well below the burst strength of the tubes.

While a particular embodiment of the invention has been shown and described, modifications may be made, and it is intended in the appended claims to cover all such modifications as may fall within the true spirit and scope of the invention.

We claim:

1. An air supply manifold for coupling a source of pressurized air to an apertured conduit, made of flexible, flimsy, transparent plastic film, in order that pressurized air may be channeled through the apertures in the conduit and then injected into the water of a hydrotherapy tank to effect water agitation, the conduit being subject to damage whenever the pressure therewithin exceeds a predetermined excessive level, comprising:

an outlet nozzle having a tapered end section followed by an annular groove and then by a threaded section, and having a maximum diameter less than that of the conduit to permit the conduit to be slipped over said nozzle to a point beyond said groove and beyond at least a portion of said threaded section;

and a snugly-fitting elastic O-ring placed over the conduit and in said groove and constructed, in conjunction with the shape of said groove, to exert on the conduit a radially inward pressure in an amount sufficient to establish an air-tight connection between the conduit and nozzle for normal operating pressures which will be well below the predetermined excessive level at which the conduit is subject to damage, rolling of said O-ring away from said groove being facilitated by said threaded section of said nozzle, said O-ring and said groove being constructed to cause the conduit to blow off of said nozzle whenever the pressurized air reaches a predetermined blow-off pressure which will be above the normal operating pressures but below the predetermined excessive level, thereby effectively providing a pressure relief valve to protect the conduit against damage otherwise caused by excessive pressure.

* * * * *